United States Patent [19]

Johnson

[11] 4,007,791
[45] Feb. 15, 1977

[54] METHOD FOR RECOVERY OF CRUDE OIL FROM OIL WELLS

[75] Inventor: Charles M. Johnson, Little Rock, Calif.

[73] Assignee: J. Carroll Baisch, Whittier, Calif.

[22] Filed: Aug. 7, 1975

[21] Appl. No.: 602,900

[52] U.S. Cl. .............................. 166/300; 166/272; 166/303

[51] Int. Cl.² ..................... F21B 43/22; E21B 43/24

[58] Field of Search .......... 166/272, 274, 275, 299, 166/300, 302, 303, 305 R, 311, 312

[56] References Cited

UNITED STATES PATENTS

| 793,128 | 6/1905 | Gardner | 166/303 |
|---|---|---|---|
| 1,169,261 | 1/1916 | Huff | 166/303 |
| 2,218,306 | 10/1940 | Austerman | 166/300 |
| 2,259,428 | 10/1941 | Shelley | 166/302 |
| 2,584,606 | 2/1952 | Merriam et al. | 166/272 |
| 2,672,201 | 3/1954 | Lorenz | 166/300 X |
| 2,799,342 | 7/1957 | Fatt | 166/300 X |
| 3,371,713 | 3/1968 | Silverman | 166/300 |
| 3,608,638 | 9/1971 | Terwilliger | 166/272 |
| 3,837,399 | 9/1974 | Allen et al. | 166/275 X |
| R26,466 | 9/1968 | Closmann et al. | 166/272 X |

*Primary Examiner*—Stephen J. Novosad
*Assistant Examiner*—George A. Suchfield
*Attorney, Agent, or Firm*—J. Carroll Baisch

[57] ABSTRACT

Method of recovery of crude oil from oil bearing formations and/or sands especially where the oil in such formations have been partly exhausted or depleted and will flow into the wells drilled into such formations at a very slow rate or not at all due to the high degree of viscosity of the oil. The method comprises thinning the crude oil in the formation by introducing into the oil well a thinning fluid, such as a solvent or mixture of solvents that will flow into the formation and thin the oil in the formation sufficiently so that it will flow into the well. A further step is heating the solvent either before the solvent is introduced into the well or after it is in the well and pressurizing the well to increase the penetration of the solvent into the formation. One method of heating the solvent in the well is to introduce water into the well, allow the solvent to rise to the surface of the water and introduce sodium into the well to cause a reaction with the water for producing heat and pressure. Heating the solvent increases its thinning action on the crude oil.

4 Claims, 6 Drawing Figures

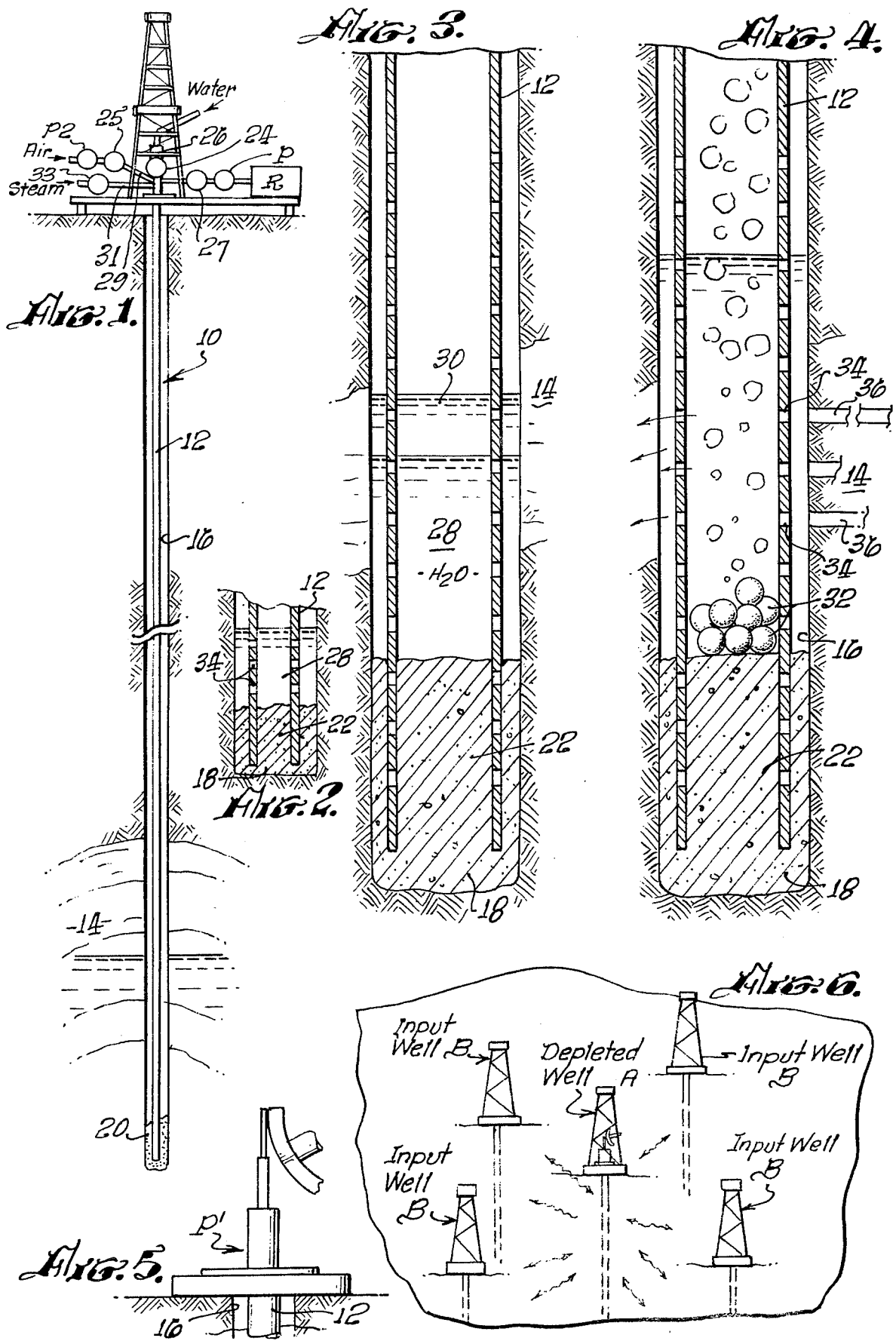

4,007,791

METHOD FOR RECOVERY OF CRUDE OIL FROM OIL WELLS

BACKGROUND OF THE INVENTION

1. Field of the Invention

This invention relates generally to methods to get crude oil from oil wells in formations that were once considered to be substantially drained dry.

2. Description of the Prior Art

A very substantial amount of oil actually remains in the ground even after there is practically no production under normal conditions and much of the oil remaining in the formation remains there because it is too viscous to flow into the well. Present methods, as far as I am aware, use high pressure streams of water, air or gas, to drive such remaining oil to the surface. With one method of recovery, what are termed "input wells" are drilled around oil wells and the stream of fluid is forced into the input wells through the oil bearing formation and into the production wells. Even with such methods there is a substantial residue of crude oil left in the formation that is not recoverable by these methods or, if recoverable at all, it is at an extremely slow rate and in small amounts or quantities.

SUMMARY OF THE INVENTION

With the present invention, an oil well that has been reduced to a well having little or no production is treated by introducing a solvent, such as naphtha, benzene, kerosene, gasoline or the like, into the well. The solvent will pass from the well into the formation into which the well has been drilled and will thin out the viscous crude oil in the formation. The solvent may be a single chemical or a combination of them. Heating the solvent makes it more effective and the solvent, with or without being heated, may be forced into the formation by pressurizing the well. The heating may be either before or after the solvent is introduced into the well. If the solvent is heated before it is introduced into the well, the solvent is put into a tank or the like and warmed or heated and then introduced into the well.

In order to force the solvent into the oil bearing formation, gas or other fluid pressure is introduced into the well so that the well will be effectively pressurized.

To heat the solvent in the well, water is introduced into the well and also the solvent, and since the solvent is lighter than water, it will flow on the surface of the water.

By dropping sized sodium pellets into the well, they will settle through the solvent and into the water. The reaction of the sodium and water produces a high temperature and pressure. The water becomes extremely hot and heats the solvent, and at the same time there is produced sodium hydroxide and hydrogen. The heat and pressure will force steam, water and solvent into the oil bearing formation and since a solvent, particularly a hot solvent, is highly effective in reducing the viscosity of the oil in the formation, the oil, upon release of pressure in the well, will flow into the well and be pumped out.

The above actions and reactions will also cause beneficial hydro-forming and alkalization of the crude oil thus enriching it.

There can be a modification of the above process by leaving out the solvent. With only water in the well, the sodium is dropped into it and the reaction of the sodium with the water will raise the water temperature to a very high degree. The hot water and steam developed will be forced into the formation to reduce the viscosity of the oil therein.

The fluid that will be pumped from the well is, of course, a mixture of crude oil and whatever has been introduced into the well such as, for example, water and/or solvent. The additive or additives are then removed from the crude oil which is processed in the usual manner. The additives may, of course, be reused.

OBJECTS AND ADVANTAGES OF THE INVENTION

It is an object of the present invention to provide a method for recovering highly viscous crude oil from oil wells by introducing an oil-thinning solvent into the well and forcing same into the adjacent oil-bearing formation into which the well has been drilled.

Another object of the present invention is to provide such a method whereby oil in the oil-bearing formation which is so viscous or thick, that it cannot be removed from the well by the usual pumping methods is therefore thinned so that it will flow into the well and be pumped out.

It is still another object of the invention to forcibly introduce into the formation a solvent that has been heated to thereby increase the effectiveness of the solvent in reducing the viscosity of the oil.

A further object of the invention is to provide a method of this character which includes the introduction of water and a solvent and introduce a chemical that will react with the water to produce heat and pressure so that heated water and solvent are forced into the adjacent formation.

A still further object of the invention is to provide a method of this character which will result in the thinned oil flowing into the well from which it is then pumped.

Another object of the invention comprises an oil recovery method that includes the use of water and a chemical that will react with the water to produce heat and pressure in the well.

Still another object of the invention is to provide a method of this character that is highly effective.

Still another object of the present invention is to provide a method of this character that is relative inexpensive.

A further object of the present invention is to provide a method of this character wherein solvent and/or water are forced through an oil bearing formation from input wells into a well or wells from which oil is to be removed.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings:

FIG. 1 is a schematic view of an oil well to be treated in accordance with the present method;

FIG. 2 is an enlarged sectional view of the lower part of an oil well having a liquid (solvent or water) therein;

FIG. 3 is an enlarged sectional view of a lower portion of the well within the oil bearing formation, water and solvent being shown within the casing of the well;

FIG. 4 is a similar view but showing the chemical pellets that have been introduced into the water to react with the water and produce heat and pressure; and FIG. 5 is a fragmentary side elevational view of the upper end of a well with a pump for pumping oil from the well; and FIG. 6 is a diagramatic view of a well with input wells disposed about it.

DESCRIPTION OF THE PREFERRED EMBODIMENT

Referring more particularly to the drawings, there is shown an oil well indicated generally at 10 with the casing 12 extending downwardly into an oil bearing formation 14. The casing 12 of the well is disposed in the usual manner within the hole 16 which has been drilled into the earth and oil-bearing formation. The lower end of the well is of the usual character and the casing is cemented in the usual well known manner as indicated at 18.

In the usual oil field practice, the well is drilled to the deepest pool and when this pool has been drained, the well is plugged back, as indicated at 22, to a shallower sand. A gun is then lowered into the well and shoots bullets through the casing and into the oil producing zone, the bullets perforating the casing, as indicated at 34, and pass into the formation as indicated at 36.

The upper end 26 of the casing is open but a valve 24 is disposed in the casing below but adjacent said upper end. There is a reservoir R for solvent connected to the casing below valve 24 by means of a conduit or a pipe, there being a pump P introduced in said line and there is a valve 27 in the conduit between the pump P and the casing.

Should it be desired to pressurize the casing with air or other gas as described hereinafter, there is a pump P2 connected to the casing below valve 24 by means of conduit 29 having a valve 25 between pump P2 and the casing, a gas such as air being pumped into the casing by pump P2.

When desired, steam is introduced into the well by means of a conduit 31, controlled by a valve 33, the steam being from a source of any well known type.

When the well is being treated in accordance with the present method, valve 24 is initially open. With valve 27 open, a solvent or thinning fluid is introduced into the well casing by pump P which pumps the solvent from reservoir R. The solvent flows to the bottom of the well as indicated at 28 in FIG. 2. The solvent is of any suitable character, as pointed out above, and additional solvents may be used such as tetrachloride or other drycleaning fluids. The solvent is forced through the perforations 34 in the casing of the well into the formation by gas pressure which is developed by pump P2, valve 25 being open but all other valves being closed. The viscous crude oil in the formation will be thinned by the solvent forced into the formation and after sufficient solvent has been forced into the formation, the pressure is released so that the thinned crude oil will flow into the well casing. It is pumped out by any well known type of pump such as indicated at P'.

While the solvent may be of normal temperature when introduced into the well casing, it may be heated in reservoir R by any suitable heating means. Pressurizing of the well is the same as above described. Referring to FIG. 3, there is shown an arrangement wherein water is introduced into the upper end of the well through the valve 24 when open. Thereafter, solvent is also introduced into the well from the reservoir R as above described.

Sufficient time is allowed to elapse for the solvent to rise to the surface of the water and form a layer on the top of the water as indicated at 30. Then with valves 25, 27 and 33 closed, pellets 32 of a chemical such as sodium are introduced into the well through valve 24 which is immediately closed. The chemical will react with the water to cause the development of high temperatures and pressures within the well. When the pellets are dropped into the well, they will pass through the layer of solvent and into the water and react with the water to produce the high temperatures and pressures required, it being understood that as soon as the pellets are dropped into the well, the well 24 is closed. While sodium pellets are used, it is to be understood that any other suitable chemical that will thus react with the water, may be used. The ratio of sodium to water is between ½–10% although more sodium may be used depending on the temperature and/or pressure desired. Sodium, granulated or small balls may be used. The solvent will be turned to a gas by the heat developed within the well and together with the water and steam, developed by the heat, will be forced through the perforations 34 in the casing and holes 36 in the formation 14.

The hot solvent will result in greatly thinning the viscous crude oil in the formation and thereafter, the pressure may be relieved in the well by opening valve 24. The thinned oil will flow into the well and be pumped therefrom.

Where water, solvent and chemicals are used in input wells B and the oil in the formation is thinned and forced into the well production A by the above described method, the oil forced into well A is then pumped therefrom by means of pump P', FIG. 5. Alternatively, my method may be used in well A to thin crude oil in the formation and force it into the wells B from which the thinned crude oil is pumped.

Under some conditions and types of crude oil bearing formations water and sodium alone may be used to heat up and thin the oil and drive such thinned oil to the surface.

In FIG. 6 there is shown a production well A about which input wells B have been drilled. Where only solvent is used, it is introduced into the input wells and under pressure as above described, the solvent is forced into and through the oil bearing formation and into the production well A. The oil thus pumped from the well will contain solvent and water, if that has been added, and the solvent and water is separated from the oil by any well-known means, or as otherwise stated, the oil will be removed from the solvent and/or water by any well-known means. The oil thus recovered is then subjected to the usual refining process or processes and the solvent and/or water may be reused in thinning the crude oil in the oil bearing formations.

In carrying out the present invention, it is to be understood that the various valves are opened or closed in accordance with the requirements of the situation.

Should any of the variants or alternatives of my invention be decided upon, it is to be understood, of course, that only the equipment required therefor need be used.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:

1. A method for recovery of crude oil from depleted oil wells, comprising:

confining water and a solvent which will float on the water in the casing of an oil well; introduction of a chemical into the well casing which will pass through the solvent and reach the water and will react with the water to produce heat and pressure within the well to force the water and solvent out of the well casing and into the crude oil bearing formation into which the well casing penetrates to thin out the crude oil in the formation and increase its fluidity; and releasing the pressure in the well casing so that the thinned crude oil will enter the well casing.

2. The invention defined by claim 1, wherein the chemical comprises sodium.

3. The invention defined by claim 2, wherein the sodium is in pellet form.

4. The invention defined by claim 2, wherein the sodium is in granulated form.

* * * * *